Figure 1:
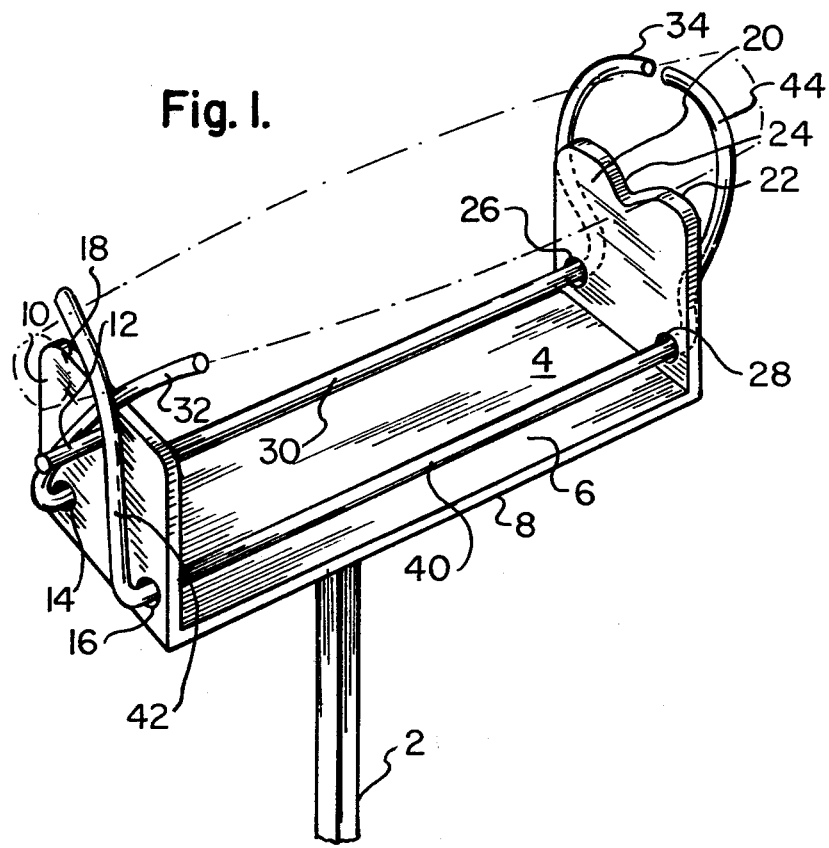

United States Patent [19]

McManus

[11] 4,245,419
[45] Jan. 20, 1981

[54] QUICK-RELEASE HOLDER

[76] Inventor: Regis P. McManus, 1325 Oakhill St., Pittsburgh, Pa. 15212

[21] Appl. No.: 49,929

[22] Filed: Jun. 19, 1979

[51] Int. Cl.³ .............................................. A01K 97/10
[52] U.S. Cl. .................................... 43/21.2; 248/538
[58] Field of Search ........................... 43/21.2, 54 SR; 248/520, 525, 526, 528, 538

[56] References Cited

U.S. PATENT DOCUMENTS

| | | | |
|---|---|---|---|
| 1,192,112 | 7/1916 | Porter | 43/21.2 |
| 1,761,497 | 6/1930 | Smith | 43/21.2 |
| 2,200,183 | 5/1940 | Legg | 43/21.2 |
| 2,682,127 | 6/1954 | Binder | 43/21.2 |
| 3,564,753 | 2/1971 | Fravel | 43/21.2 |
| 3,669,390 | 6/1972 | Nielson | 43/21.2 |
| 3,835,568 | 9/1974 | Whitfield | 43/21.2 |
| 3,956,846 | 5/1976 | Kent | 43/21.2 |

FOREIGN PATENT DOCUMENTS 554898  2/1957  Belgium .................................... 43/21.2

Primary Examiner—Nicholas P. Godici
Attorney, Agent, or Firm—Buell, Blenko, Ziesenheim & Beck

[57] ABSTRACT

A quick-release fishing pole holder has a base member for maintaining two axially rotatable members in opposed relationship. The rotatable members have cooperating front end portions and rear end portions extending upwardly from the base member. The front end portions also extend inwardly to cross each other under the fishing pole and to engage the fishing pole. The rear end portions also extend upwardly and inwardly to substantially encircle a perimeter of the fishing pole. A fish strike causes the fishing pole handle to pivot on the front cooperating end portions, but to be restrained from rotation by the encircling rear end portions. A fisherman grabs the handle and pulls upwardly to control the pole. The front cooperating end portions do not then engage the fishing rod and the opposed members can rotate as the fishing pole handle is pulled upwardly against the rear cooperating end portions.

3 Claims, 2 Drawing Figures

U.S. Patent     Jan. 20, 1981     4,245,419

QUICK-RELEASE HOLDER

This invention relates to a holder for releasably supporting a fishing pole and more particularly a holder which can be quickly and easily released by the fisherman.

Holders of various types have been used for many years to support an unattended fishing pole while the fisherman is occupied with other activities. The art has developed holders having quickly releasable mechanisms for permitting the fisherman to grab the pole from the holder when a fish takes the bait. Such prior art quick-release holders do not allow the fisherman to take instant control of the line as naturally as if he himself had always held the pole. Also the art has not developed a holder which is structurely simple and convenient to use.

I have invented a novel holder which has a true quick-release feature for allowing the fisherman to grab the fishing pole handle with one hand (so that the other hand can take the reel) and to pull the pole straight back as naturally as if he were holding the pole when the fish struck. Also, the fisherman's grabbing and pulling motion is the only way of releasing the holder embodying my invention. Further, the force of a fish strike on my holder prevents a release. Accordingly, I provide a quick-release holder comprising a base member and opposed axially rotatable members spaced apart by the base member for releasably supporting a fishing pole. The opposed rotatable members have front and rear cooperating end portions. The front end portions are adapted to engage the fishing pole and to prevent the holder from releasing the fishing pole; and thus, the front end portion extends upwardly from the base member and is disposed inwardly to cross the other under the fishing pole. The rear end portions are adapted to substantially encircle a perimeter of the fishing rod; and thus, each rear end portion extends upwardly from the base member and is disposed to approach the other. By substantially encircling a perimeter of the fishing rod, the rear cooperating members restrain a turning angular motion caused by a fish strike; and by engaging the fishing rod, the front cooperating members prevent rotation by the opposed members as the angular turning rotation of the rod urges them apart. Only by pulling the fishing rod from engaging contact with the cooperating front end portions, can the fisherman free the encircling cooperating rear portions and cause them to rotate away from the rising fishing pole.

Other details, objects and advantages of the invention will become apparent as the following description of a present preferred embodiment thereof proceeds.

Figure 2:
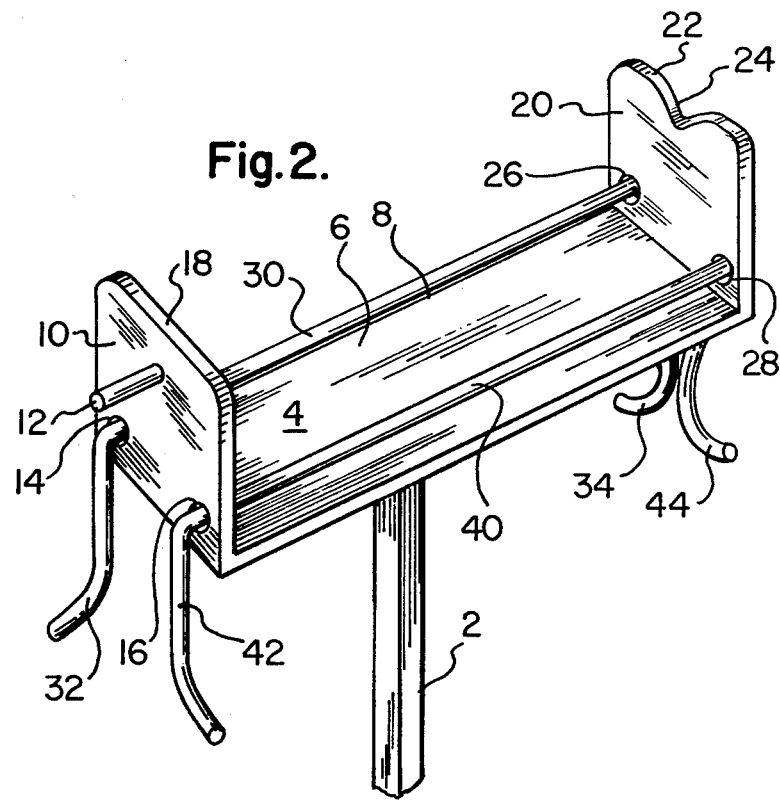

In the accompanying drawings I have shown a perspective view of a quick-release holder embodying my invention for releasably supporting a fishing pole in which:

FIG. 1 shows a holder in the closed position as it would hold a fishing pole (shown in phantom); and FIG. 2 shows a holder after the rod has been released.

The quick-release holder as illustrated generally comprises two opposed rotatable members 30 and 40 spaced apart by base member 4.

The base member 4 generally comprises a channel shaped structure having front and rear projections 10 and 20 extending upwardly from surface 6 of crown portion 8. A stake 2 is fastened to the bottom surface of crown 8 by any suitable means and is designed to be stuck into the bank around a river, lake, pool or the like. A cross pin 12 projects from front channel projection 10 for supporting rotatable members 30 and 40 as described below. The upper edge 22 of rear channel projection 20 has a notch 24 for supporting the fishing pole handle.

Rotatable member 30 is supported by base member 4 through holes 14 and 26 in front projection 10 and rear projection 20 respectively. Similarly rotatable member 40 is supported through holes 16 and 28 of front and rear channel projections 10 and 20 respectively. Front end portions 32 and 42 of rotatable members 30 and 40 extend upwardly of the crown portion 8 and are disposed inwardly to cross each other under a fishing rod. I prefer to support front end portions 32 and 42 on cross pin 12 and to have a fishing rod resting directly on the V-support formed (most preferably) slightly above upper edge 18 thereby firmly holding the rotatable members in place. Rear end portions 34 and 44 of rotatable members 30 and 40 respectively extend upwardly of the crown portion 8 and are disposed inwardly toward and approaching each other, but, preferably not touching each other. Without pin 12, my invention can be practiced (although less effectively) by permitting the rotating members to be restrained in one direction by the interference of the rod with the rear end portions 34 and 44.

Referring to FIG. 1, the fisherman uses my invention by placing the butt end of a fishing pole handle on the rear projection notch 24 under cooperating rear end portions 34 and 44 and by resting the front end of the handle in the V-support formed by the cooperating front end portions 32 and 42. The fishing rod is firmly in place and will not roll. The fishing pole and cross pin 12 hold the rotatable members 30 and 40 and prevent their rotation. When a fish strikes the bait and pulls down on the line, the pole pivots on the V-support at the front end of the holder, tending to cause the rod to rotate and the butt end to rise from the notch 24. The rod is restrained from rotation by the rear cooperating end portions 34 and 44. The rotatable members 30 and 40 are restrained by the fishing rod pivoting on the cooperating end portions 32 and 42. When a fisherman grabs the handle and pulls the pole upward, the front cooperating end portions 32 and 42 are unhindered. The upward force of the end of the handle on the rear cooperating end portions 34 and 44 completely releases the pole and the rotatable members 30 and 40 fall away as shown in FIG. 2. In the most preferred embodiment, the fisherman grabs the handle over the crown 8 with one hand and grabs the reel with his other hand and merely pulls the pole free of the holder.

I may also so arrange the rotatable members 30 and 40 that there is a slight tendency for them to rotate to the open position as shown in FIG. 2. For example, I may selectively weight or shape sections of the rear cooperating end portions.

While I have shown and described a present preferred embodiment of the invention, it is to be distinctly understood that the invention is not limited thereto but may be otherwise variously embodied within the scope of the following claims:

I claim:

1. A quick-release holder for releasably supporting a fishing pole comprising
   (a) a base member; and
   (b) opposed axially freely rotatable members spaced apart by the base member, and having (i) cooperating front end portions movable between a first non-engaging position in which said front end portions are spaced apart and a second engaging support position in which each end portion extends upwardly from the base member and inwardly to cross the other forming a rigid V-support for the fishing pole to rest, and (ii) cooperating rear end portions movable with said front end portions between a first position in which said rear end portions are spaced apart and a second position in which said rear end members encircle a perimeter of the fishing pole which remains encircled so long as the V-support configuration in the front end portion is maintained, each rear end portion extending upwardly from the base member and disposed to approach the other.

2. The quick-release holder of claim 1 further comprising a pin projecting from the base member and disposed to support the cooperating front end portions of the rotatable members.

3. The quick-release holder of claim 2 wherein the base member comprises a channel having spaced apart front and rear projections extending upwardly from a crown portion and the end portions of the rotatable members are arranged to cooperate beyond the channel projections whereby the fishing pole may be grabbed above the crown portion of the channel.

* * * * *